United States Patent
Morton

(10) Patent No.: US 7,719,964 B2
(45) Date of Patent: May 18, 2010

(54) DATA CREDIT POOLING FOR POINT-TO-POINT LINKS

(76) Inventor: Eric Morton, 12901 Majestic Oaks Dr., Austin, TX (US) 78732

( * ) Notice: Subject to any disclaimer, the term of this patent is extended or adjusted under 35 U.S.C. 154(b) by 1309 days.

(21) Appl. No.: 10/918,771

(22) Filed: Aug. 12, 2004

(65) Prior Publication Data

US 2006/0034172 A1 Feb. 16, 2006

(51) Int. Cl.
   *G06F 13/00* (2006.01)
(52) U.S. Cl. .................. 370/229; 370/235; 370/412
(58) Field of Classification Search ......... 370/229–241, 370/252–253, 412–417, 389; 709/234–235, 709/226
   See application file for complete search history.

(56) References Cited

U.S. PATENT DOCUMENTS

| | | | | |
|---|---|---|---|---|
| 6,785,241 B1 * | 8/2004 | Lu et al. | | 370/241 |
| 6,922,408 B2 * | 7/2005 | Bloch et al. | | 370/389 |
| 6,944,173 B1 * | 9/2005 | Jones et al. | | 370/413 |
| 7,283,473 B2 * | 10/2007 | Arndt et al. | | 370/231 |
| 7,301,898 B1 * | 11/2007 | Martin et al. | | 370/229 |
| 7,327,749 B1 * | 2/2008 | Mott | | 370/413 |
| 7,471,628 B2 * | 12/2008 | Wang | | 370/231 |
| 7,474,613 B2 * | 1/2009 | Bergamasco et al. | | 370/229 |
| 7,480,730 B2 * | 1/2009 | Stuart et al. | | 709/232 |
| 2001/0033552 A1 * | 10/2001 | Barrack et al. | | 370/282 |
| 2001/0043564 A1 * | 11/2001 | Bloch et al. | | 370/230 |
| 2002/0159385 A1 * | 10/2002 | Susnow et al. | | 370/229 |
| 2003/0189935 A1 * | 10/2003 | Warden et al. | | 370/395.21 |
| 2003/0223444 A1 * | 12/2003 | Lambrecht | | 370/412 |
| 2004/0013088 A1 * | 1/2004 | Gregg | | 370/235 |
| 2004/0019714 A1 * | 1/2004 | Kelley et al. | | 710/52 |
| 2004/0252685 A1 * | 12/2004 | Kagan et al. | | 370/389 |
| 2005/0018609 A1 * | 1/2005 | Dally et al. | | 370/235 |
| 2005/0018674 A1 * | 1/2005 | Dropps et al. | | 370/389 |
| 2005/0063306 A1 * | 3/2005 | Wise et al. | | 370/235 |
| 2005/0063308 A1 * | 3/2005 | Wise et al. | | 370/236 |
| 2005/0088967 A1 * | 4/2005 | Cen | | 370/228 |
| 2005/0226145 A1 * | 10/2005 | Garmire et al. | | 370/229 |
| 2005/0226146 A1 * | 10/2005 | Rider | | 370/229 |
| 2005/0228900 A1 * | 10/2005 | Stuart et al. | | 709/234 |
| 2005/0254519 A1 * | 11/2005 | Beukema et al. | | 370/468 |
| 2008/0117931 A1 * | 5/2008 | Beukema et al. | | 370/468 |
| 2008/0205278 A1 * | 8/2008 | Garmire et al. | | 370/235 |

OTHER PUBLICATIONS

*HyperTransport™ I/O Link Specification Revision 1.03*, HyperTransport™ Consortium, Oct. 10, 2001, Copyright © 2001 HyperTransport Technology Consortium.

* cited by examiner

*Primary Examiner*—Frank Duong
*Assistant Examiner*—Habte Mered

(57) ABSTRACT

A system includes a first device and a second device interconnected with a point-to-point link and operable to transmit data to each other via the point-to-point link. The first device is operable to provide data credits to the second device which facilitate transmission of the data to the first device via the point-to-point link in a plurality of virtual channels. First ones of the data credits are derived from a plurality of shared data credits each of which is operable to facilitate transmission of the data in any of the virtual channels. Second ones of the data credits include a plurality of dedicated data credits each of which is operable to facilitate transmission of the data in a corresponding one of the virtual channels.

22 Claims, 4 Drawing Sheets

DATA CREDIT POOLING FOR POINT-TO-POINT LINKS

BACKGROUND OF THE INVENTION

The present invention relates to data transmission in tightly coupled point-to-point system architectures and, more specifically, to credit based links in such architectures.

Point-to-point architectures are fast gaining acceptance as higher bandwidth alternatives to traditional bus architectures in tightly coupled systems. In such systems, individual devices or nodes may be interconnected in a variety of topologies using single or pairs of unidirectional point-to-point links between the devices. An example of such a system is a multiprocessor computing system in which processing nodes communicate with each other and system memory via such an architecture. One such point-to-point architecture is the HyperTransport™ architecture pioneered by AMD of Sunnyvale, Calif.

In some point-to-point systems, the transmission of data between two devices over a particular point-to-point link may be facilitated using a credit based approach. According to such an approach, data credits are provided to the transmitting device indicating that the receiving device is ready to receive some unit of data, e.g., a packet. The number of data credits typically corresponds to the amount of buffer space available in the receiving device to store data for consumption by the receiving device. When the transmitting device is ready to transmit data, it determines whether it has any data credits and, if so, decrements a credit counter and transmits the data to the receiving device. The receiving device typically releases the data credit back to the transmitting device (which then increments its credit counter) when the transmitted data is consumed from the buffer.

The latency associated with the transmission of a particular data packet and the subsequent return of the corresponding data credit may be understood with reference to the diagram of FIG. 1. The diagram illustrates an exemplary latency associated with a receiving device RX A consuming a 64-byte data packet and then returning the corresponding data credit to a transmitting device TX B. Assuming the numbers shown for transmitter, receiver and internal device latencies results in a total loop delay of approximately 324 ns. Further assume that the link between the devices is a 3.2 GB/second link. In order to "hide" the loop latency, i.e., allow the link to operate at full bandwidth without stalling, sufficient buffer space to store 1036 (324×3.2) bytes of data must be provided in the receiving device RX A, e.g., seventeen 64-byte buffers.

Devices in point-to-point architectures may employ a data transmission protocol which transmits data in different "virtual" channels. That is, at the protocol level, data packets are segregated and handled differently for a variety of purposes. In general, virtual channels are set up such that none of the virtual channels is allowed to stall as a direct result of another virtual channel stalling. This is accomplished by having dedicated buffers for each virtual channel. That is, each buffer and its corresponding data credit is dedicated for the transmission and storage of data packets in a particular virtual channel. And because the receiving device cannot predict the distribution of data traffic over the different virtual channels, if full bandwidth operation is to be supported for every virtual channel, the data credits and corresponding buffer space required for full bandwidth operation must be replicated for each virtual channel. This accounts for the condition in which all of the data are being transmitted in a particular virtual channel.

So, for example, if the system of FIG. 1 had three virtual channels, full bandwidth operation would require 51 buffers rather than 17.

In the example of FIG. 1, each data credit requires a 512 bit buffer array in the receiving device, a significant expense in chip area. In addition, larger arrays tend to have longer access times. This forces the designer to make design choices that may limit performance on some virtual channels in order to fit the data buffer in either the chip area or the timing constraints. It is therefore desirable to provide techniques which mitigate or avoid the negative consequences associated with such design choices.

SUMMARY OF THE INVENTION

According to the present invention, data credits associated with a point-to-point link may be shared among different virtual channels. According to a specific embodiment, a system includes a first device and a second device interconnected with a point-to-point link and operable to transmit data to each other via the point-to-point link. The first device is operable to provide data credits to the second device which facilitate transmission of the data to the first device via the point-to-point link in a plurality of virtual channels. First ones of the data credits are derived from a plurality of shared data credits each of which is operable to facilitate transmission of the data in any of the virtual channels. Second ones of the data credits include a plurality of dedicated data credits each of which is operable to facilitate transmission of the data in a corresponding one of the virtual channels.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

It should also be understood that the various embodiments of the invention may be implemented in a wide variety of ways without departing from the scope of the invention. That is, the processes and circuits described herein may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., ASICs) suitable for designing and manufacturing the processes and circuits described herein are within the scope of the invention.

Figure 1:
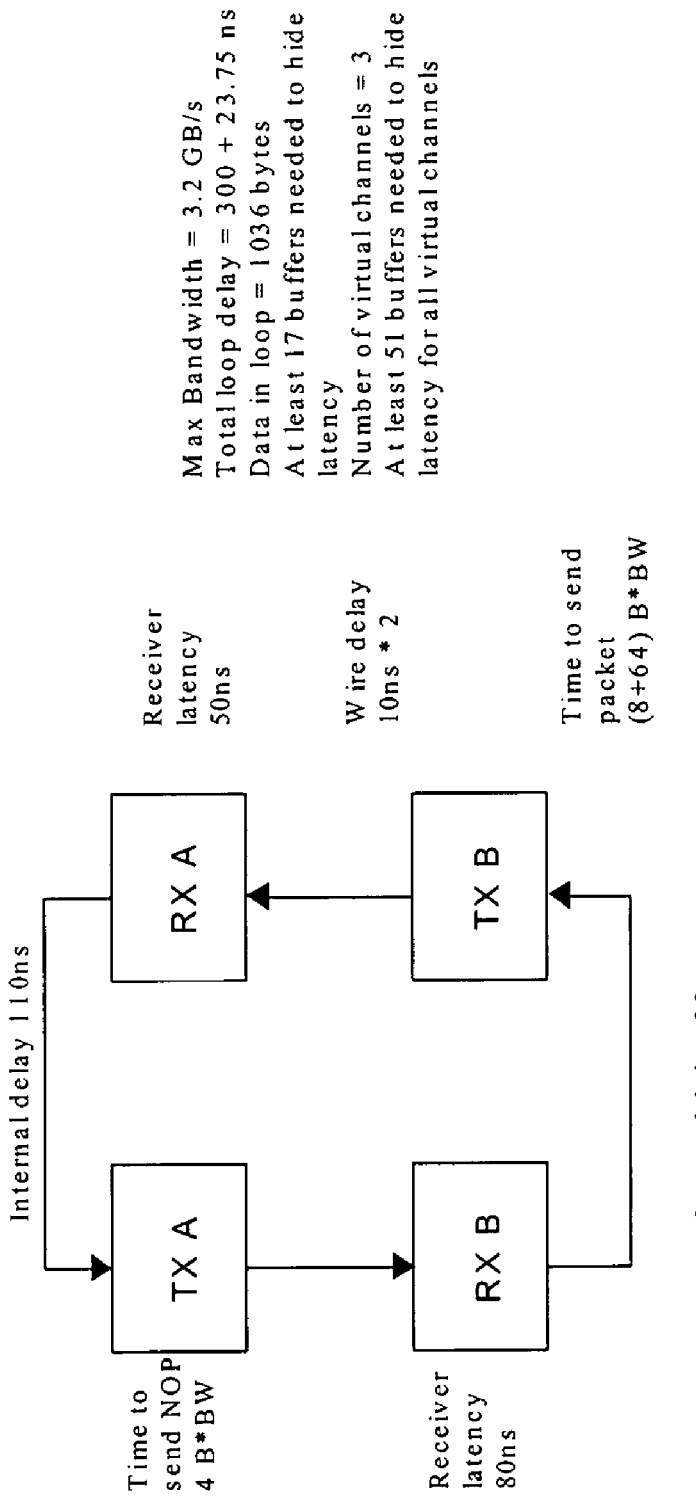
FIG. 1 is a simplified block diagram illustrating a loop latency associated with a point-to-point link.

The present invention is derived from the recognition of the fact that, for a credit based point-to-point link having all of its buffers dedicated to particular virtual channels (such as described above with reference to FIG. 1), the conditions under which all of the buffers will be full at one time are rare. That is, for example, for the exemplary link of FIG. 1, typically only 17 buffers will be full at any given time, i.e., full bandwidth operation. However, because the distribution of data packets across the different virtual channels cannot be predicted, and because the transmitting device needs to have some number of data credits for each virtual channel, specific embodiments of the present invention employ an approach in which some of the data credits and buffers are dedicated to particular virtual channels, and some are shared among the virtual channels.

According to a specific embodiment, the receiving device transmits all of the dedicated data credits to the transmitting device when the link is initialized, and returns one dedicated data credit each time a data packet is consumed from the corresponding buffer. This is similar to the approach described above with reference to FIG. 1. However, the receiving device also retains some number of shared data credits when the link is initialized, each shared credit being released to the transmitting device when a shared buffer is available to receive a data packet. The invention may be implemented without changing the link layer protocol from the perspective of the transmitting device. That is, before the shared data credit is released to the transmitting device it is designated as corresponding to a particular virtual channel so that the operation of the transmitting device remains the same.

In effect, the shared pool technique of the present invention adds one data credit to a virtual channel while the system is in the process of transferring and/or consuming data transmitted in that channel. After the data are consumed, the credit is then added back to the shared pool. In essence an unused shared credit is exchanged for a used dedicated credit. The effect of this approach both on the loop latency as well as the chip area may be understood with reference to the example of FIG. 2 which assumes some of the same numbers as the example of FIG. 1.

Figure 2:
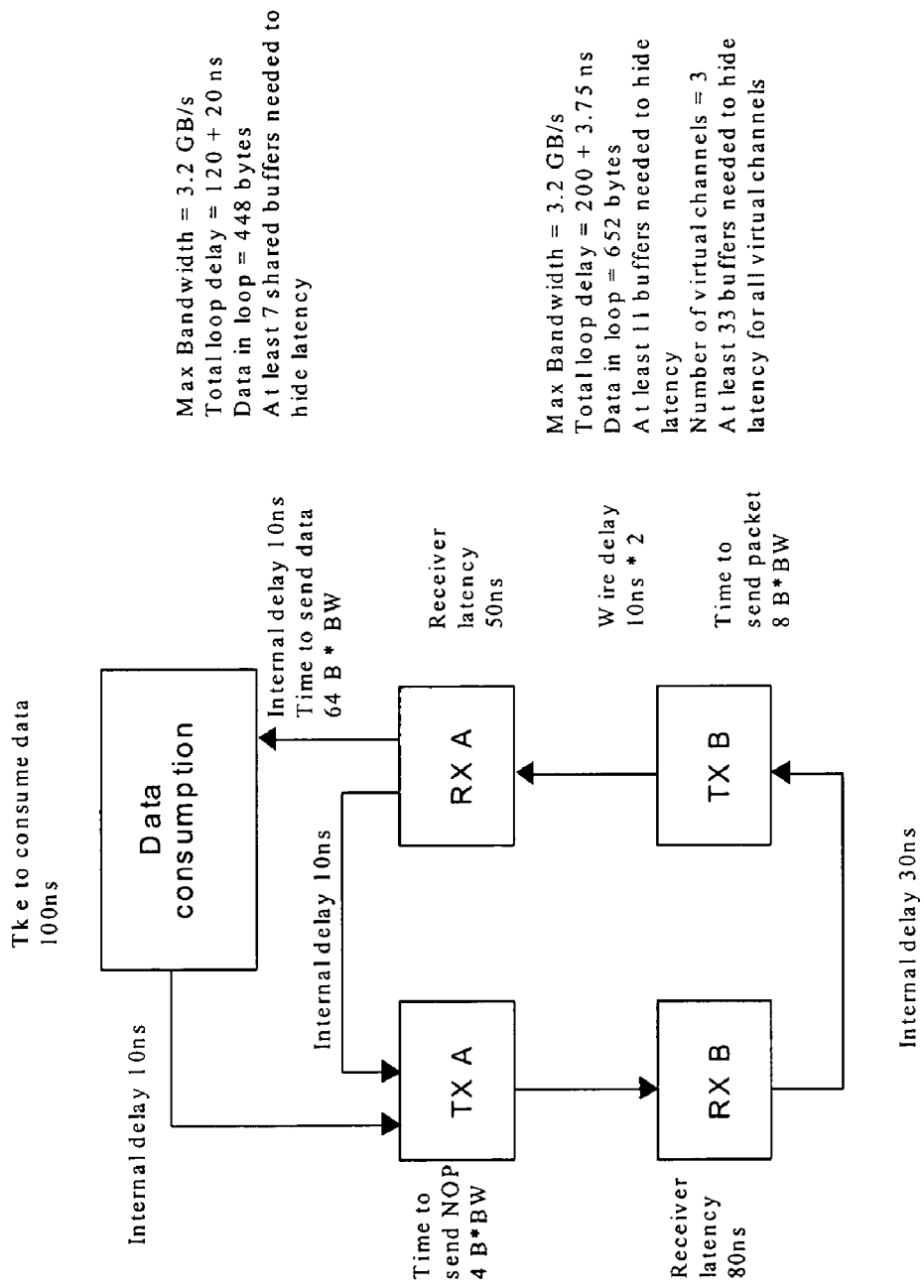
FIG. 2 is simplified block diagram illustrating an alternative representation of a loop latency associated with a point-to-point link according to a specific embodiment of the invention.

In the example of FIG. 2, the loop latency is divided into two components which are considered in determining the number of buffers required to permit full bandwidth operation of the link between devices A and B. The latency component associated with the lower loop (i.e., the time required to transfer the command packet to device A and return a data credit to device B) determines the number of buffers which must be dedicated to each virtual channel. The latency component associated with the upper loop (i.e., the time required to consume data from a shared buffer and return the corresponding data credit to the shared pool) determines how many shared buffers need to be provided.

In this example, the latencies associated with RX A, TX A, RX B, and RX A, and the internal latency of device B are assumed to be the same as described above with reference to the example of FIG. 1. However, the internal delay of device A, i.e., the time required for RX A to signal to its transmitter logic TX A that a data credit may be released to device B, is dramatically reduced relative to the example of FIG. 1 because device A does not need to wait until data in a buffer are consumed before releasing the credit. That is, because the shared data credit may be designated to any of the virtual channels, when device A receives a packet in a particular virtual channel, a credit for that same channel may be returned almost immediately.

Thus, in the example of FIG. 2, because the lower loop latency is approximately 204 ns, only 11 buffers are needed to hide the loop latency, i.e., rounding up from (204×3.2/64). With three virtual channels, this means now only 33 buffers dedicated to the virtual channels need to be provided in device A. However, this assumes that there are also a sufficient number of shared buffers to hide the latency associated with the consumption of data from the shared buffers. As mentioned above, the number of shared buffers required is determined with reference to the latency associated with the upper loop in FIG. 2.

To ensure that at least one shared credit is available under the conditions assumed in the example, there must be enough shared buffers to hide the latency associated with the time required to consume a data packet, i.e., the latency of the upper loop. Assuming this latency to be 140 ns as shown in FIG. 2, the number of shared buffers required to hide this latency is 7, i.e., rounding up from (140×3.2/64). Therefore, the full bandwidth performance described above with reference to FIG. 1 may be achieved with a total of 40 buffers rather than 51. This is obviously a significant reduction in chip area without a corresponding impact on link throughput. It will be appreciated that such an approach allows the designer much greater flexibility in making design tradeoffs.

So, depending on the balance struck by the designer, at link initialization, some number of data credits (each of which is designated to a particular virtual channel) are released by the receiving device to the transmitting device, the number being fewer than the total number of data credits available. The remaining data credits are retained by the receiving device in a shared pool which is tracked by internal logic in the receiving device.

A specific embodiment of a technique for managing credits for a point-to-point link will be described with reference to the flowchart of FIG. 3. The exemplary embodiment shown is implemented to be compatible with an underlying link layer protocol employing multiple virtual channels as described above. According to one set of embodiments, the underlying link layer protocol is described in the HyperTransport™ I/O Link Specification, Revision 1.10 from the HyperTransport™ Consortium, the entire disclosure of which is incorporated herein by reference for all purposes. This embodiment is also implemented to ensure that forward progress is maintained among the different virtual channels. According to a more specific embodiment, the technique ensures compatibility with devices and systems based on HyperTransport™ technology.

As described above, the receiving device maintains a shared pool of data credits that are held at link initialization time rather than being sent to the transmitting device on the other side of the link as is done with the dedicated data credits. The shared pool is not initially allocated to a virtual channel. Instead, as will be described they are interchanged with a credit of a particular virtual channel immediately after a command is received that will have data in that virtual channel. When this is done, the newly designated credit is sent out immediately and a "mark" is made in the data buffer that indicates a shared credit was used. This mark ensures that when data in the corresponding data buffer are consumed, a credit is not to be returned to the transmitting device, but instead returned to the shared pool in the receiving device.

If a command with data is received when the receiving device does not have any available shared credits, a mark is made in the data buffer that indicates a shared credit was not used. This mark ensures that when the data in the data buffer are consumed, a dedicated credit for that virtual channel is to be released to the transmitting device. The virtual channel in which the data were transmitted is also identified in the data buffer.

Figure 3:
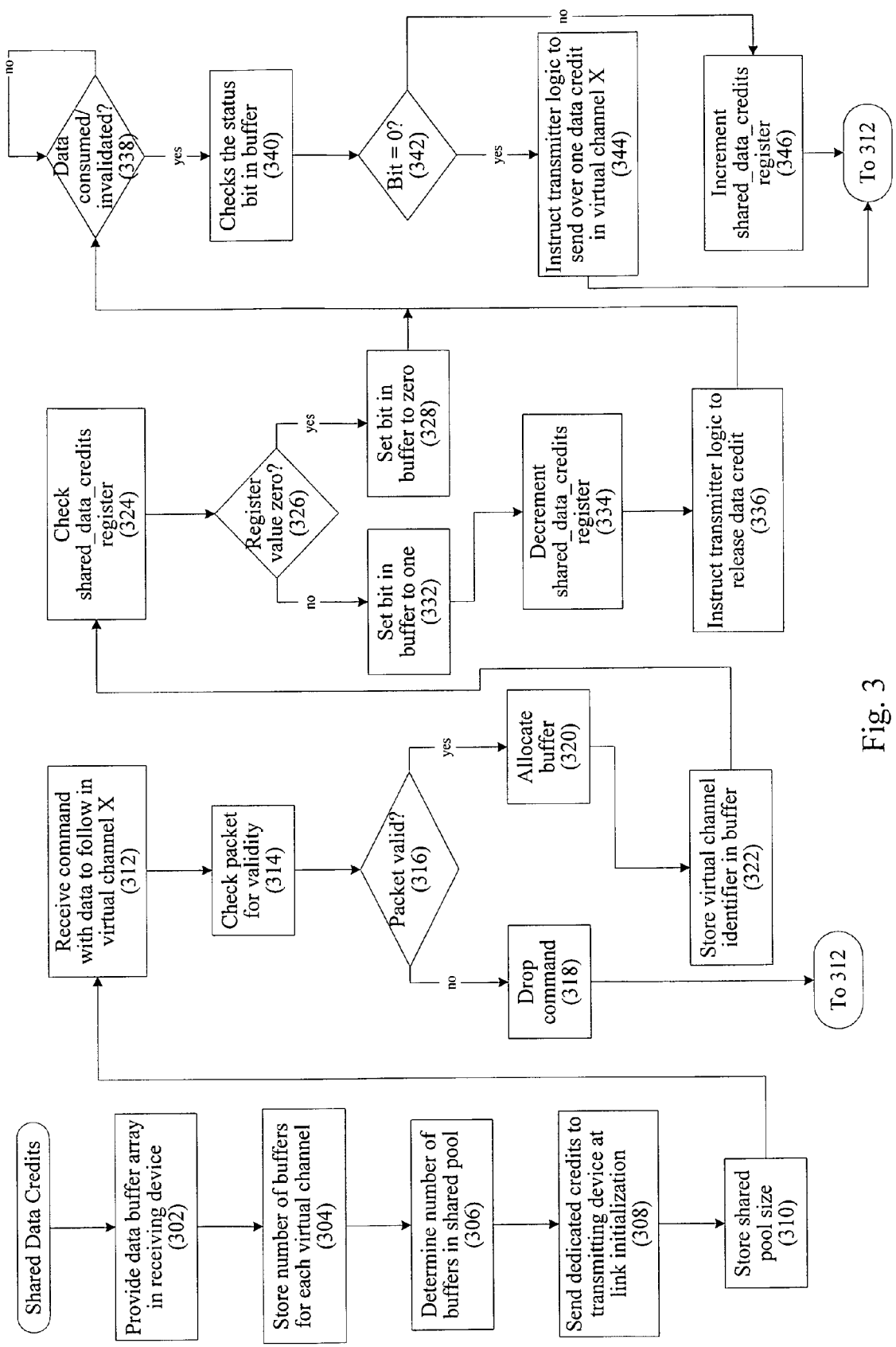
FIG. 3 is a flowchart illustrating the operation of a credit based point-to-point link according to a specific embodiment of the invention.

Referring now to FIG. 3, a data buffer array of size N is provided in the receiving device which is logically (not physically) divided into four subsections (302), i.e., a dedicated area for each of three virtual channels and a shared pool. It will be understood that the number three is merely exemplary and that a fewer or greater number of virtual channels may be employed.

The number (or size) of the buffers for each of the three virtual channels is stored in a configuration register (304). The number (or size) of the buffers in the shared pool can be calculated by hardware with reference to the total array size and the three virtual channel settings, or it may also be stored in a configuration register (306). At link initialization time, the dedicated credits are sent to the transmitting device on the other side of the point-to-point link as discussed above (308). The shared pool size is stored in a register "shared_data_credits" and the credits are not yet sent (310).

When a command indicating that data are to follow is received by the receiver logic in a virtual channel X (312), the packet is first checked for validity according to some error detection logic (314). If the packet is invalid (316), then the command is dropped and the retry behavior dictated by the architecture is performed (318). If the packet is valid (316), then a buffer in the buffer array is allocated for the incoming data (320). The identity of virtual channel X is saved in this buffer (322).

The receiver logic then consults the "shared_data_credits" register (324). If the register's value is zero (326), then a bit in the allocated buffer is set to zero (328) and no shared data credits are used. If the shared_data_credits register is non-zero (326), then the bit in the buffer is set to one (332), the shared_data_credits register is decremented by one (334), and a signal is sent to the transmitter to send over one data credit for virtual channel X (336). It will be understood that this description is merely exemplary and that a variety of mechanisms may be employed to implement this functionality.

When the data in a particular buffer are either consumed or invalidated at 316 (338), the data array logic checks the status of the mark saved with the buffer (340). If the mark is zero (342), then a signal is sent to the transmitter logic to send over one data credit for virtual channel X (344), where X is the virtual channel identifier that was saved in the buffer. If the mark is one (342), then the receiver logic is instructed to increment the shared_data_credits register by one (346), and no credit is sent.

Since the process of consuming, invalidating and pushing data credits may occur simultaneously in one cycle, the logic in the receiving device allows for the overlap. This may mean, for example, that the "shared_data_credits" register could be both incremented and decremented in one cycle, or could be incremented or decremented by more than one. The "shared_data_credits" register should never go less than zero, nor should it ever overflow to a number greater than the original size.

It is possible for the shared_data_credits register to be zero on a given cycle that has both a data buffer allocation and a data buffer being consumed that will have its credit returned to the "shared_data_credits" pool. In such a cycle, it would be ideal, but not necessary, for the data buffer allocation to recognize that the "shared_data_credits" register will be non-zero at the end of the cycle and act accordingly, however this is not required in order to maintain integrity of the system. This event should be rare if the data array is sized properly. It should also be noted that the foregoing embodiment may be programmed to operate without the technique of the present invention if the reset value of the "shared_data_credits" register is zero.

When altering the parameters associated with the data credit technique described herein, the designer should consider the potential for introducing deadlock conditions into the system. For example, the technique described above with reference to FIG. 3 will not add any deadlocks as long as the number of credits reserved for each virtual channel is greater than the minimum number necessary to avoid deadlocks. Depending on the nature of the point-to-point link and the operation of the link layer protocol, the minimum number to avoid deadlocks is generally one or two.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed to implement a wide variety of devices and systems, i.e., any device or system which employs credit based point-to-point links. One example of such a system is a multiprocessor computer system in which the processors communicate with each other and system memory via credit based point-to-point links. An exemplary multiprocessor system which may be implemented according to the invention is shown in FIG. 4.

Figure 4:
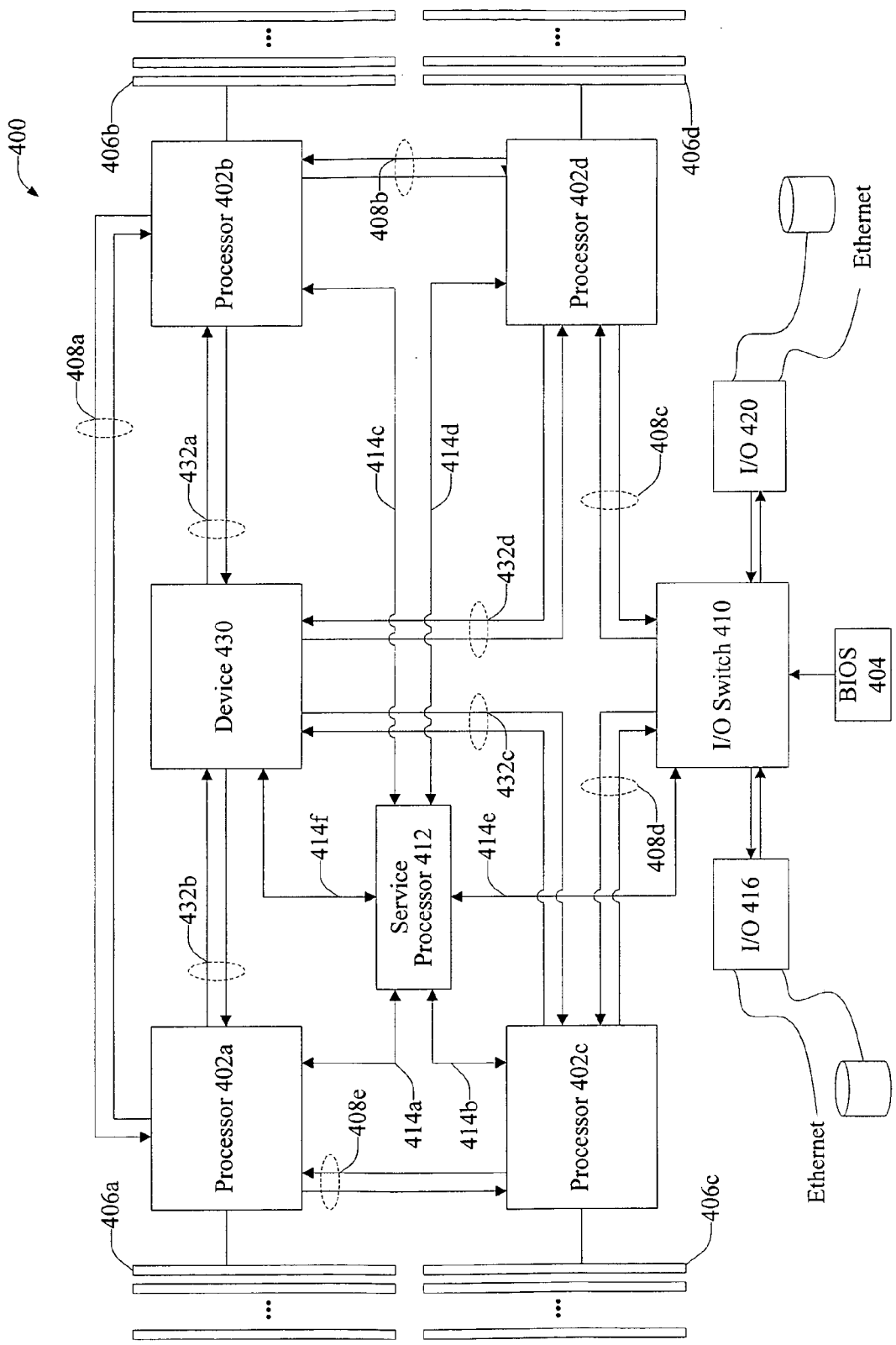
FIG. 4 is an exemplary multiprocessor system which may be implemented using various embodiments of the invention.

FIG. 4 is a diagrammatic representation of a multiprocessor computing system which may be implemented according to the present invention. System 400 includes processors 402a-402d, one or more Basic I/O systems (BIOS) 404, a memory subsystem comprising memory banks 406a-406d, point-to-point communication links 408a-408e, and a service processor 412. The point-to-point communication links are credit based and are configured to allow interconnections between processors 402a-402d, I/O switch 410, and device 430. The service processor 412 is configured to allow communications with processors 402a-402d, I/O switch 410, and device 430 via a JTAG interface represented in FIG. 4 by links 414a-414f.

According to a specific embodiment, service processor 412 is operable to write to configuration registers associated with each of processors 402a-402d and device 430. That is, service processor 412 sets the values in the configuration registers which govern the transmission of data over the point-to-point links in accordance with the present invention. According to another embodiment, any of processors 402a-402d and device 430 may be operable to configure the other devices. I/O switch 410 connects the rest of the system to I/O adapters 416 and 420. Each of processors 402a-402d may comprise multiple sub-units, e.g., CPUs, memory controllers, I/O bridges, etc.

The processors 402a-d are also coupled to device 430 through credit based point-to-point links 432a-d. Device 430 may comprise a variety of devices configured to communicate with the processors and I/O using the same point-to-point protocols employed by processors 402a-402d. For example, and without limitation, device 430 may comprise another processor, a cache coherence controller for maintaining cache coherency among the processors, an interconnection controller for interconnecting the processors of system 400 with other multiprocessor clusters in a larger multi-cluster system (and maintaining cache coherency among the clusters), and a probe filtering unit for reducing probe traffic within system 400.

According to various embodiments, device 430 is configured to communicate with the other devices in system 400 using shared data credits as described herein. That is, device 430 is operable to communicate with processors 402a-402d via links 432a-d according to the present invention. According to some of these embodiments, any of processors 402a-402d may also be configured to operate in accordance with the present invention. According to others, processors 402a-402d are not configured to operate in accordance with the invention. Rather, they are configured to operate according to a conventional credit based approach. And because the present invention may be implemented on one or both sides of a point-to-point link, the present invention may be used, for example, to design a device (e.g., device 430) which is compatible with previously designed devices without altering the behavior or designs of such devices.

It should also be understood that although embodiments have been described herein with reference to HyperTransport™ technology, the present invention may be implemented in any system employing credit based point-to-point links.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A data processing system comprising a first device and a second device interconnected with a point-to-point link and operable to transmit data to each other via the point-to-point link, the first device being operable to provide data credits to the second device which facilitate transmission of the data to the first device via the point-to-point link in a plurality of virtual channels, wherein the data credits correspond to a plurality of buffers in the first device for storing the data, first ones of the data credits being derived from a plurality of shared data credits each of which is operable to facilitate transmission of the data in any of the virtual channels, a first number of the buffers being allocated as shared buffers for use in conjunction with the shared data credits, second ones of the data credits comprising a plurality of dedicated data credits each of which is operable to facilitate transmission of the data in a corresponding one of the virtual channels, a second number of the buffers being allocated to each virtual channel for use in conjunction with the dedicated data credits, wherein the first number of buffers is determined with reference to a first time required to consume data from one of the shared buffers and return a corresponding one of the shared data credits to a shared pool, further wherein the second number of buffers is determined with reference to a second time required to transfer a packet from the second device to the first device and return a corresponding one of the dedicated data credits to the second device, and wherein the first device is operable to transmit all of the dedicated data credits to the second device and retain at least some of the shared data credits upon initialization of the point-to-point link, and wherein the first device is operable to designate a particular one of the shared data credits as corresponding to a first one of the virtual channels in response to an indication that a data packet will be transmitted via the first virtual channel.

2. The system of claim 1 wherein the first device is operable to transmit the particular shared data credit to the second device if space in the shared buffers in the first device is available.

3. The system of claim 1 wherein the second device is operable to employ the dedicated data credits to the first device to facilitate transmission of the data to the first device in the corresponding virtual channels, the first device being operable to subsequently release the dedicated data credits to the second device only after the data are consumed from buffers in the first device indicating the corresponding virtual channels.

4. The system of claim 1 wherein at least one of the virtual channels transmits only requests and at least one other of the virtual channels transmits only responses to requests.

5. The system of claim 1, a total number of the buffers corresponds to a latency defined by a loop including the first and second devices and the point-to-point link.

6. The system of claim 5 wherein the total number of buffers is sufficient to allow the point-to-point link to operate at full bandwidth.

7. The system of claim 5 wherein the number of the dedicated data credits is greater than or equal to a minimum number necessary to avoid a deadlock condition.

8. The system of claim 1 wherein the data are transmitted via the point-to-point link and the virtual channels according to a point-to-point protocol.

9. The system of claim 8 wherein the point-to-point protocol comprises the HyperTransport™ protocol.

10. The system of claim 1 wherein the second device comprises a processing node in a multi-processor computing system.

11. The system of claim 10 wherein the first device comprises an interconnection controller operable to interconnect multiple multi-processor clusters in the computing system.

12. The system of claim 10 wherein the first device comprises a cache coherence controller operable to facilitate cache coherency among a plurality of processing nodes in the computing system.

13. The system of claim 10 wherein the first device comprises a probe filtering unit operable to reduce probe traffic in the system.

14. The system of claim 1 wherein the second device is also operable to provide data credits to the first device which facilitate transmission of the data to the second device via the point-to-point link in the plurality of virtual channels, third ones of the data credits being derived from a second plurality of shared data credits each of which is operable to facilitate transmission of the data in any of the virtual channels, fourth ones of the data credits comprising a second plurality of dedicated data credits each of which is operable to facilitate transmission of the data in a corresponding one of the virtual channels.

15. A first device for use in a system comprising the first device and a second device interconnected with a point-to-point link, the second device being operable to transmit data to the first device via the point-to-point link, the first device being operable to provide data credits to the second device which facilitate transmission of the data to the first device via the point-to-point link in a plurality of virtual channels, the data credits corresponding to a plurality of buffers in the first device for storing the data, first ones of the data credits being derived from a plurality of shared data credits each of which is operable to facilitate transmission of the data in any of the virtual channels, a first number of the buffers being allocated as shared buffers for use in conjunction with the shared data credits, second ones of the data credits comprising a plurality of dedicated data credits each of which is operable to facilitate transmission of the data in a corresponding one of the virtual channels, a second number of the buffers being allocated to each virtual channel for use in conjunction with the dedicated data credits, wherein the first number of buffers is determined with reference to a first time required to consume data from one of the shared buffers and return a corresponding one of the shared data credits to a shared pool, further wherein the second number of buffers is determined with reference to a second time required to transfer a packet from the second device to the first device and return a corresponding one of the dedicated data credits to the second device, and wherein the first device is operable to transmit all of the dedicated data credits to the second device and retain at least some of the shared data credits upon initialization of the point-to-point link, and wherein the first device is further operable to designate a particular one of the shared data credits as corresponding to a first one of the virtual channels in response to an indication that a data packet will be transmitted via the first virtual channel.

16. An integrated circuit comprising the first device of claim 15.

17. The integrated circuit of claim 16 wherein the integrated circuit comprises an application-specific integrated circuit.

18. At least one computer-readable non-transitory storage medium having data structures stored therein representative of the first device of claim 15.

19. The at least one computer-readable non-transitory storage medium of claim 18 wherein the data structures comprise a simulatable representation of the first device.

20. The at least one computer-readable non-transitory storage medium of claim 19 wherein the simulatable representation comprises a netlist.

21. The at least one computer-readable non-transitory storage medium of claim 18 wherein the data structures comprise a code description of the first device.

22. The at least one computer-readable non-transitory storage medium of claim 21 wherein the code description corresponds to a hardware description language.

* * * * *